US011924828B2

(12) United States Patent
Taherzadeh Boroujeni et al.

(10) Patent No.: US 11,924,828 B2
(45) Date of Patent: Mar. 5, 2024

(54) ADAPTIVE DEMODULATION REFERENCE SIGNAL DENSITY FOR PHYSICAL DOWNLINK CONTROL CHANNEL

(71) Applicant: QUALCOMM Incorporated, San Diego, CA (US)

(72) Inventors: Mahmoud Taherzadeh Boroujeni, San Diego, CA (US); Juan Montojo, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 243 days.

(21) Appl. No.: 17/370,858

(22) Filed: Jul. 8, 2021

(65) Prior Publication Data

US 2022/0015123 A1 Jan. 13, 2022

Related U.S. Application Data

(60) Provisional application No. 62/705,696, filed on Jul. 10, 2020.

(51) Int. Cl.
*H04W 72/12* (2023.01)
*H04W 72/1273* (2023.01)

(52) U.S. Cl.
CPC .............................. *H04W 72/1273* (2013.01)

(58) Field of Classification Search
CPC . H04W 72/1273; H04L 5/0053; H04L 5/0051
See application file for complete search history.

(56) References Cited

U.S. PATENT DOCUMENTS

2015/0230211 A1\* 8/2015 You .................. H04L 5/0051
370/330
2015/0249517 A1\* 9/2015 Seo .................. H04L 5/0051
370/329

(Continued)

FOREIGN PATENT DOCUMENTS

KR 20180122919 A 11/2018
WO WO-2019122518 A1 6/2019

OTHER PUBLICATIONS

International Search Report and Written Opinion—PCT/US2021/070856—ISA/EPO—dated Oct. 29, 2021.

(Continued)

*Primary Examiner* — Hoang-Chuong Q Vu
(74) *Attorney, Agent, or Firm* — Harrity & Harrity LLP/Qualcomm Incorporated

(57) ABSTRACT

A user equipment may receive a configuration that indicates a density of demodulation reference signal (DMRS) resource elements and a set of locations of the DMRS resource elements in one or more resource element groups associated with a physical downlink control channel (PDCCH); receive an indication of a change to at least one of the density of the DMRS resource elements or the set of locations of the DMRS resource elements, resulting in at least one of a modified density of the DMRS resource elements or a modified set of locations of the DMRS resource elements; and monitor for downlink control information in a search space associated with the PDCCH based at least in part on the at least one of the modified density of the DMRS resource elements or the modified set of locations of the DMRS resource elements.

30 Claims, 9 Drawing Sheets

(56) References Cited

U.S. PATENT DOCUMENTS

| | | | |
|---|---|---|---|
| 2016/0037491 A1* | 2/2016 | Hwang | H04L 5/0053 |
| | | | 370/330 |
| 2019/0052527 A1* | 2/2019 | Ghosh | H04L 25/0224 |
| 2020/0052846 A1 | 2/2020 | Takeda et al. | |
| 2020/0099500 A1* | 3/2020 | Huang | H04W 72/0446 |
| 2020/0106581 A1* | 4/2020 | Nammi | H04L 5/0048 |
| 2020/0136788 A1* | 4/2020 | Liu | H04W 56/001 |
| 2021/0135789 A1* | 5/2021 | Wu | H04L 5/0051 |
| 2021/0266846 A1* | 8/2021 | Do | H04L 5/001 |
| 2021/0385804 A1* | 12/2021 | Ye | H04L 5/0048 |
| 2022/0159674 A1* | 5/2022 | Deng | H04W 72/566 |
| 2022/0191081 A1* | 6/2022 | Kim | H04L 5/0094 |

OTHER PUBLICATIONS

Nokia, et al., "Remaining Details of PDCCH Construction", 3GPP Draft, 3GPP TSG RAN WG1 Meeting NR#3, R1-1715748_NRPDCCH Structure, 3rd Generation Partnership Project (3GPP), Mobile Competence Centre, 650, Route Des Lucioles, F-06921 Sophia-Antipolis Cedex, France, vol. RAN WG1, No. Nagoya, Japan, Sep. 18, 2017-Sep. 21, 2017, Sep. 17, 2017 (Sep. 17, 2017), XP051339210, 6 Pages, Retrieved from the Internet: URL:http://www.3gpp.org/ftp/Meetings_3GPP_SYNC/RAN1/Docs/ [retrieved on Sep. 17, 2017] p. 4.

\* cited by examiner

REG with DMRS density of 1/2

ADAPTIVE DEMODULATION REFERENCE SIGNAL DENSITY FOR PHYSICAL DOWNLINK CONTROL CHANNEL

CROSS-REFERENCE TO RELATED APPLICATION

This Patent application claims priority to U.S. Provisional Patent Application No. 62/705,696, filed on Jul. 10, 2020, entitled "ADAPTIVE DEMODULATION REFERENCE SIGNAL DENSITY FOR PHYSICAL DOWNLINK CONTROL CHANNEL," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for adaptive demodulation reference signal density for a physical downlink control channel.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink (or "forward link") refers to the communication link from the BS to the UE, and "uplink" (or "reverse link") refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a UE includes: receiving a configuration that indicates a density of demodulation reference signal (DMRS) resource elements and a set of locations of the DMRS resource elements in one or more resource element groups associated with a physical downlink control channel (PDCCH); receiving an indication of a change to at least one of the density of the DMRS resource elements or the set of locations of the DMRS resource elements, resulting in at least one of a modified density of the DMRS resource elements or a modified set of locations of the DMRS resource elements; and monitoring for downlink control information in a search space associated with the PDCCH based at least in part on the at least one of the modified density of the DMRS resource elements or the modified set of locations of the DMRS resource elements.

In some aspects, a method of wireless communication performed by a base station includes: transmitting, to a UE, a configuration that indicates a density of DMRS resource elements and a set of locations of the DMRS resource elements in one or more resource element groups associated with a PDCCH; and transmitting, to the UE, an indication of a change to at least one of the density of the DMRS resource elements or the set of locations of the DMRS resource elements, resulting in at least one of a modified density of the DMRS resource elements or a modified set of locations of the DMRS resource elements.

In some aspects, a UE for wireless communication includes: memory; one or more processors coupled to the memory; and instructions stored in the memory and operable, when executed by the one or more processors, to cause the UE to: receive a configuration that indicates a density of DMRS resource elements and a set of locations of the DMRS resource elements in one or more resource element groups associated with a PDCCH; receive an indication of a change to at least one of the density of the DMRS resource elements or the set of locations of the DMRS resource elements, resulting in at least one of a modified density of the DMRS resource elements or a modified set of locations of the DMRS resource elements; and monitor for downlink control information in a search space associated with the PDCCH based at least in part on the at least one of the modified density of the DMRS resource elements or the modified set of locations of the DMRS resource elements.

In some aspects, a base station for wireless communication includes: memory; one or more processors coupled to the memory; and instructions stored in the memory and operable, when executed by the one or more processors, to cause the base station to: transmit, to a UE, a configuration that indicates a density of DMRS resource elements and a set of locations of the DMRS resource elements in one or more resource element groups associated with a PDCCH; and transmit, to the UE, an indication of a change to at least one of the density of the DMRS resource elements or the set of locations of the DMRS resource elements, resulting in at least one of a modified density of the DMRS resource elements or a modified set of locations of the DMRS resource elements.

In some aspects, a non-transitory computer-readable medium stores one or more instructions for wireless communication that, when executed by one or more processors of a UE, cause the UE to: receive a configuration that indicates a density of DMRS resource elements and a set of locations of the DMRS resource elements in one or more resource element groups associated with a PDCCH; receive an indication of a change to at least one of the density of the DMRS resource elements or the set of locations of the DMRS resource elements, resulting in at least one of a modified density of the DMRS resource elements or a modified set of locations of the DMRS resource elements; and monitor for downlink control information in a search space associated with the PDCCH based at least in part on the at least one of the modified density of the DMRS resource elements or the modified set of locations of the DMRS resource elements.

In some aspects, a non-transitory computer-readable medium stores one or more instructions for wireless communication that, when executed by one or more processors of a base station, cause the base station to: transmit, to a UE, a configuration that indicates a density of DMRS resource elements and a set of locations of the DMRS resource elements in one or more resource element groups associated with a PDCCH; and transmit, to the UE, an indication of a change to at least one of the density of the DMRS resource elements or the set of locations of the DMRS resource elements, resulting in at least one of a modified density of the DMRS resource elements or a modified set of locations of the DMRS resource elements.

In some aspects, an apparatus for wireless communication includes: means for receiving a configuration that indicates a density of DMRS resource elements and a set of locations of the DMRS resource elements in one or more resource element groups associated with a PDCCH; means for receiving an indication of a change to at least one of the density of the DMRS resource elements or the set of locations of the DMRS resource elements, resulting in at least one of a modified density of the DMRS resource elements or a modified set of locations of the DMRS resource elements; and means for monitoring for downlink control information in a search space associated with the PDCCH based at least in part on the at least one of the modified density of the DMRS resource elements or the modified set of locations of the DMRS resource elements.

In some aspects, an apparatus for wireless communication includes: means for transmitting, to UE, a configuration that indicates a density of DMRS resource elements and a set of locations of the DMRS resource elements in one or more resource element groups associated with a PDCCH; and means for transmitting, to the UE, an indication of a change to at least one of the density of the DMRS resource elements or the set of locations of the DMRS resource elements, resulting in at least one of a modified density of the DMRS resource elements or a modified set of locations of the DMRS resource elements.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, radio frequency (RF) chains, power amplifiers, modulators, buffers, processor(s), interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
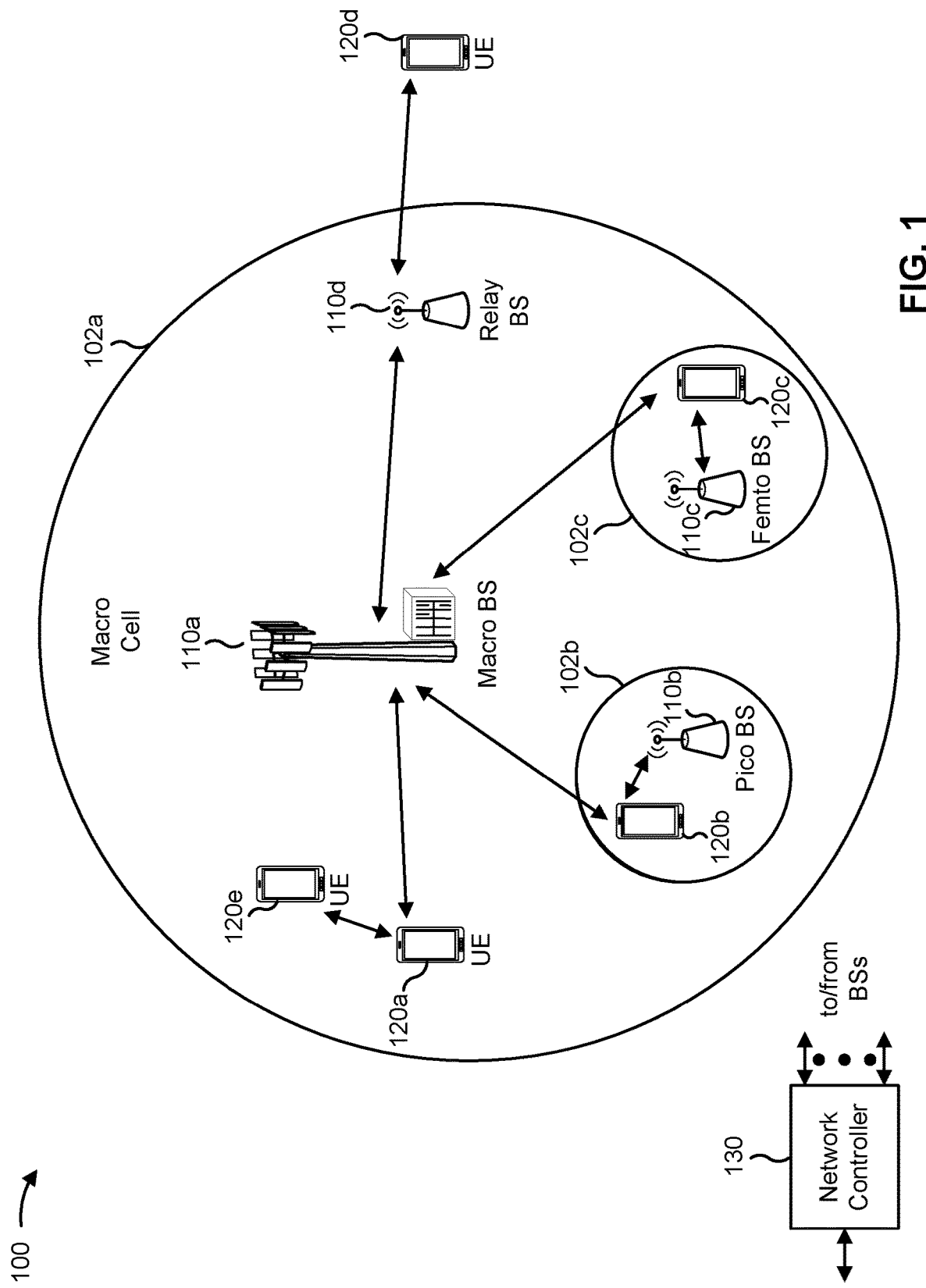
FIG. 1 is a diagram illustrating an example of a wireless network, in accordance with the present disclosure.

In 5G, a physical downlink control channel (PDCCH) candidate may include one or multiple control channel elements (CCEs), and a CCE typically includes six resource element groups (REGs) with twelve resource elements (REs). Currently in 5G, the number and locations of demodulation reference signal (DMRS) REs in a REG are fixed. However, in some cases, a greater density of DMRS REs may lead to more efficient channel estimation and PDCCH monitoring. In other cases, reduction of DMRS REs may allow for increased downlink control information (DCI) transmission.

Some techniques and apparatuses described herein enable a base station to set a density and locations of DMRS REs in a REG associated with a PDCCH for a UE using a semi-static configuration and change the density and locations of the DMRS REs in the REG using dynamic signaling. As a result, the density of DMRS REs can be dynamically increased to improve efficiency of channel estimation and PDCCH monitoring by the UE and/or dynamically decreased to increase the amount of DCI transmitted in a PDCCH communication. This increases the efficiency of PDCCH communications, thus improving network capacity, speed, and/or reliability.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
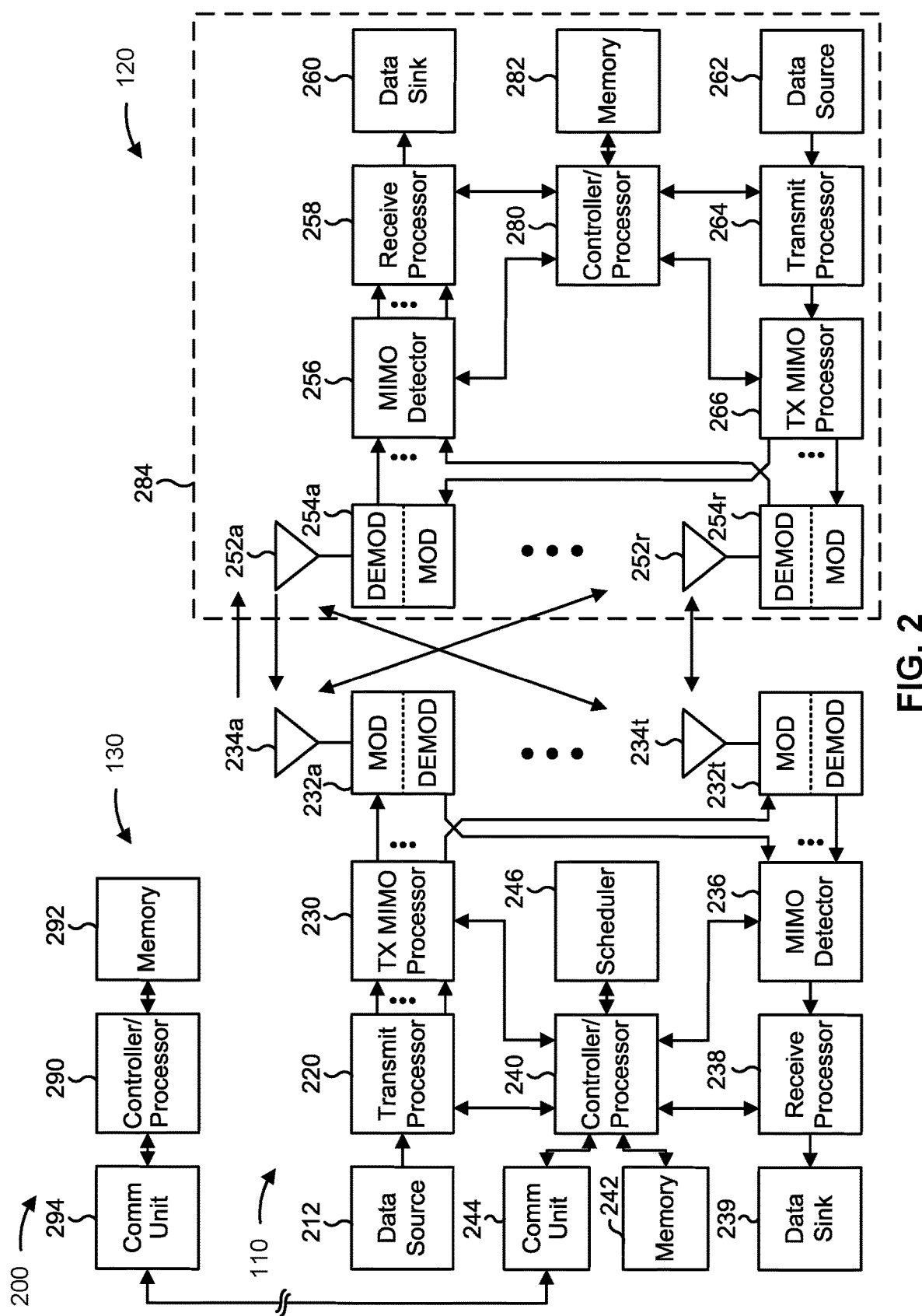
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 5-9).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 5-9).

Controller/processor 240 of base station 110, controller/processor 280 of UE 120, and/or any other component(s) of FIG. 2 may perform one or more techniques associated with adaptive DMRS density for PDCCH, as described in more detail elsewhere herein. For example, controller/processor 240 of base station 110, controller/processor 280 of UE 120, and/or any other component(s) of FIG. 2 may perform or direct operations of, for example, process 800 of FIG. 8, process 900 of FIG. 9, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 800 of FIG. 8, process 900 of FIG. 9, and/or other processes as described herein. In some aspects, executing instructions may include running the instructions, converting the instructions, compiling the instructions, and/or interpreting the instructions, among other examples.

In some aspects, UE 120 may include means for receiving a configuration that indicates a density of DMRS resource elements and a set of locations of the DMRS resource elements in one or more resource element groups associated with a PDCCH, means for receiving an indication of a change to at least one of the density of the DMRS resource elements or the set of locations of the DMRS resource elements, resulting in at least one of a modified density of the DMRS resource elements or a modified set of locations of the DMRS resource elements, and/or means for monitoring for downlink control information in a search space associated with the PDCCH based at least in part on the at least one of the modified density of the DMRS resource elements or the modified set of locations of the DMRS resource elements. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive and/or processor 258.

In some aspects, base station 110 may include means for transmitting, to a UE, a configuration that indicates a density of DMRS resource elements and a set of locations of the DMRS resource elements in one or more resource element groups associated with a PDCCH, and/or means for transmitting, to the UE, an indication of a change to at least one of the density of the DMRS resource elements or the set of locations of the DMRS resource elements, resulting in at least one of a modified density of the DMRS resource elements or a modified set of locations of the DMRS resource elements. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, and/or antenna 234.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
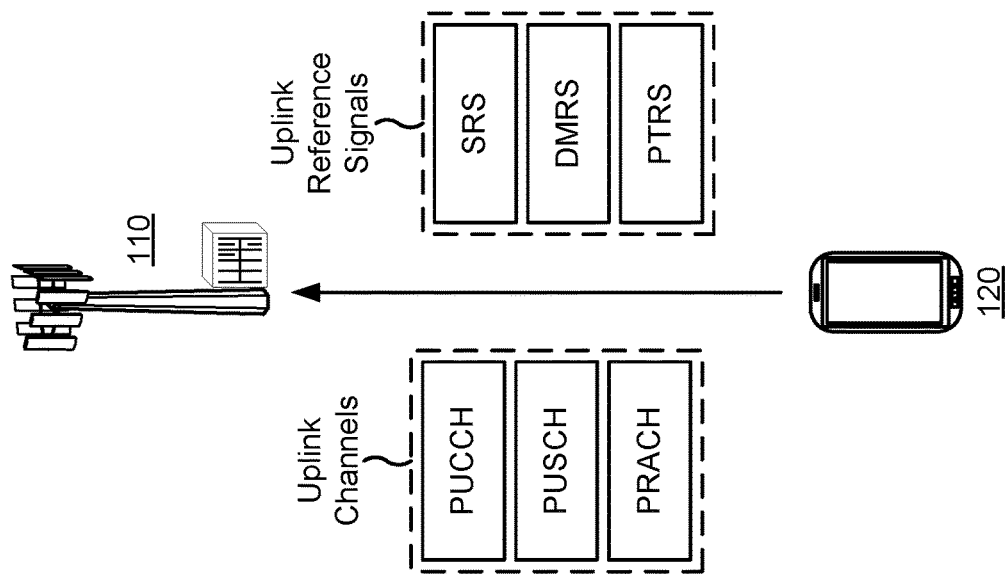
FIG. 3 is a diagram illustrating an example of physical channels and reference signals in a wireless network, in accordance with the present disclosure.
Figure 3:
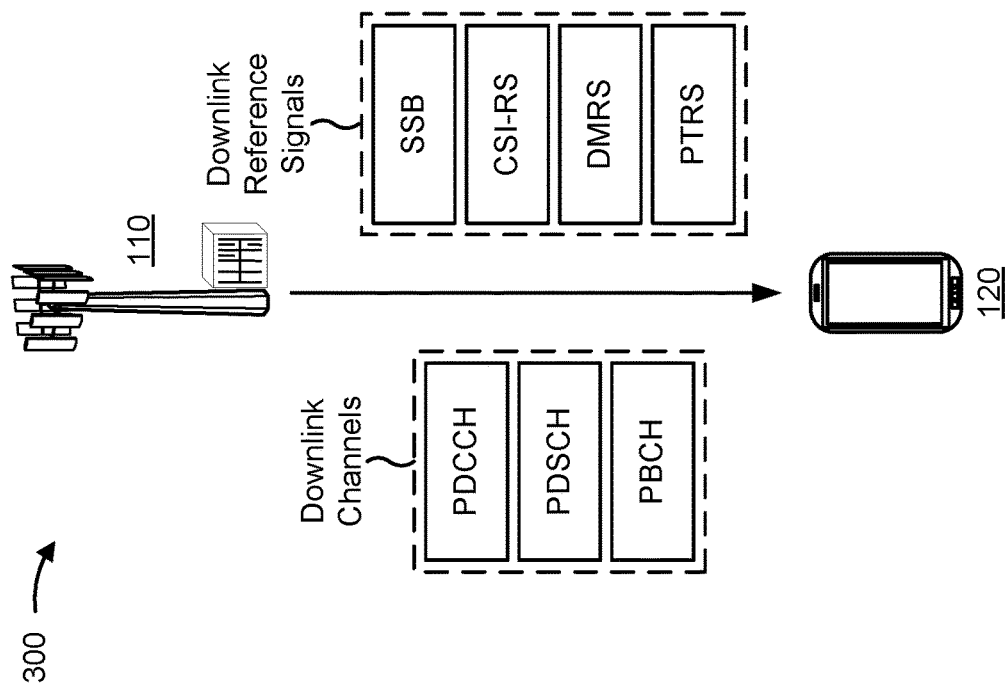

FIG. 3 is a diagram illustrating an example 300 of physical channels and reference signals in a wireless network, in accordance with the present disclosure. As shown in FIG. 3, downlink channels and downlink reference signals may carry information from a base station 110 to a UE 120, and uplink channels and uplink reference signals may carry information from a UE 120 to a base station 110.

As shown, a downlink channel may include a PDCCH that carries DCI, a physical downlink shared channel (PDSCH) that carries downlink data, or a physical broadcast channel (PBCH) that carries system information, among other examples. In some aspects, PDSCH communications may be scheduled by PDCCH communications. As further shown, an uplink channel may include a physical uplink control channel (PUCCH) that carries uplink control information (UCI), a physical uplink shared channel (PUSCH) that carries uplink data, or a physical random access channel (PRACH) used for initial network access, among other examples. In some aspects, the UE 120 may transmit acknowledgement (ACK) or negative acknowledgement (NACK) feedback (e.g., ACK/NACK feedback or ACK/NACK information) in UCI on the PUCCH and/or the PUSCH.

As further shown, a downlink reference signal may include a synchronization signal block (SSB), a channel state information (CSI) reference signal (CSI-RS), a DMRS, or a phase tracking reference signal (PTRS), among other examples. As also shown, an uplink reference signal may include a sounding reference signal (SRS), a DMRS, or a PTRS, among other examples.

An SSB may carry information used for initial network acquisition and synchronization, such as a primary synchronization signal (PSS), a secondary synchronization signal (SSS), a PBCH, and a PBCH DMRS. An SSB is sometimes referred to as a synchronization signal/PBCH (SS/PBCH) block. In some aspects, the base station 110 may transmit multiple SSBs on multiple corresponding beams, and the SSBs may be used for beam selection.

A CSI-RS may carry information used for downlink channel estimation (e.g., downlink CSI acquisition), which may be used for scheduling, link adaptation, or beam management, among other examples. The base station 110 may configure a set of CSI-RSs for the UE 120, and the UE 120 may measure the configured set of CSI-RSs. Based at least in part on the measurements, the UE 120 may perform channel estimation and may report channel estimation parameters to the base station 110 (e.g., in a CSI report), such as a channel quality indicator (CQI), a precoding matrix indicator (PMI), a CSI-RS resource indicator (CRI), a layer indicator (LI), a rank indicator (RI), or a reference signal received power (RSRP), among other examples. The base station 110 may use the CSI report to select transmission parameters for downlink communications to the UE 120, such as a number of transmission layers (e.g., a rank), a precoding matrix (e.g., a precoder), a modulation and coding scheme (MCS), or a refined downlink beam (e.g., using a beam refinement procedure or a beam management procedure), among other examples.

A DMRS may carry information used to estimate a radio channel for demodulation of an associated physical channel (e.g., PDCCH, PDSCH, PBCH, PUCCH, or PUSCH). The design and mapping of a DMRS may be specific to a physical channel for which the DMRS is used for estimation. DMRSs are UE-specific, can be beamformed, can be confined in a scheduled resource (e.g., rather than transmitted on a wideband), and can be transmitted only when necessary. As shown, DMRSs are used for both downlink communications and uplink communications.

A PTRS may carry information used to compensate for oscillator phase noise. Typically, the phase noise increases as the oscillator carrier frequency increases. Thus, PTRS can be utilized at high carrier frequencies, such as millimeter wave frequencies, to mitigate phase noise. The PTRS may be used to track the phase of the local oscillator and to enable suppression of phase noise and common phase error. As shown, PTRSs are used for both downlink communications (e.g., on the PDSCH) and uplink communications (e.g., on the PUSCH).

An SRS may carry information used for uplink channel estimation, which may be used for scheduling, link adaptation, precoder selection, or beam management, among other examples. The base station 110 may configure one or more SRS resource sets for the UE 120, and the UE 120 may transmit SRSs on the configured SRS resource sets. An SRS resource set may have a configured usage, such as uplink CSI acquisition, downlink CSI acquisition for reciprocity-based operations, uplink beam management, among other examples. The base station 110 may measure the SRSs, may perform channel estimation based at least in part on the measurements, and may use the SRS measurements to configure communications with the UE 120.

As indicated above, FIG. 3 is provided as an example. Other examples may differ from what is described with regard to FIG. 3.

Figure 4:
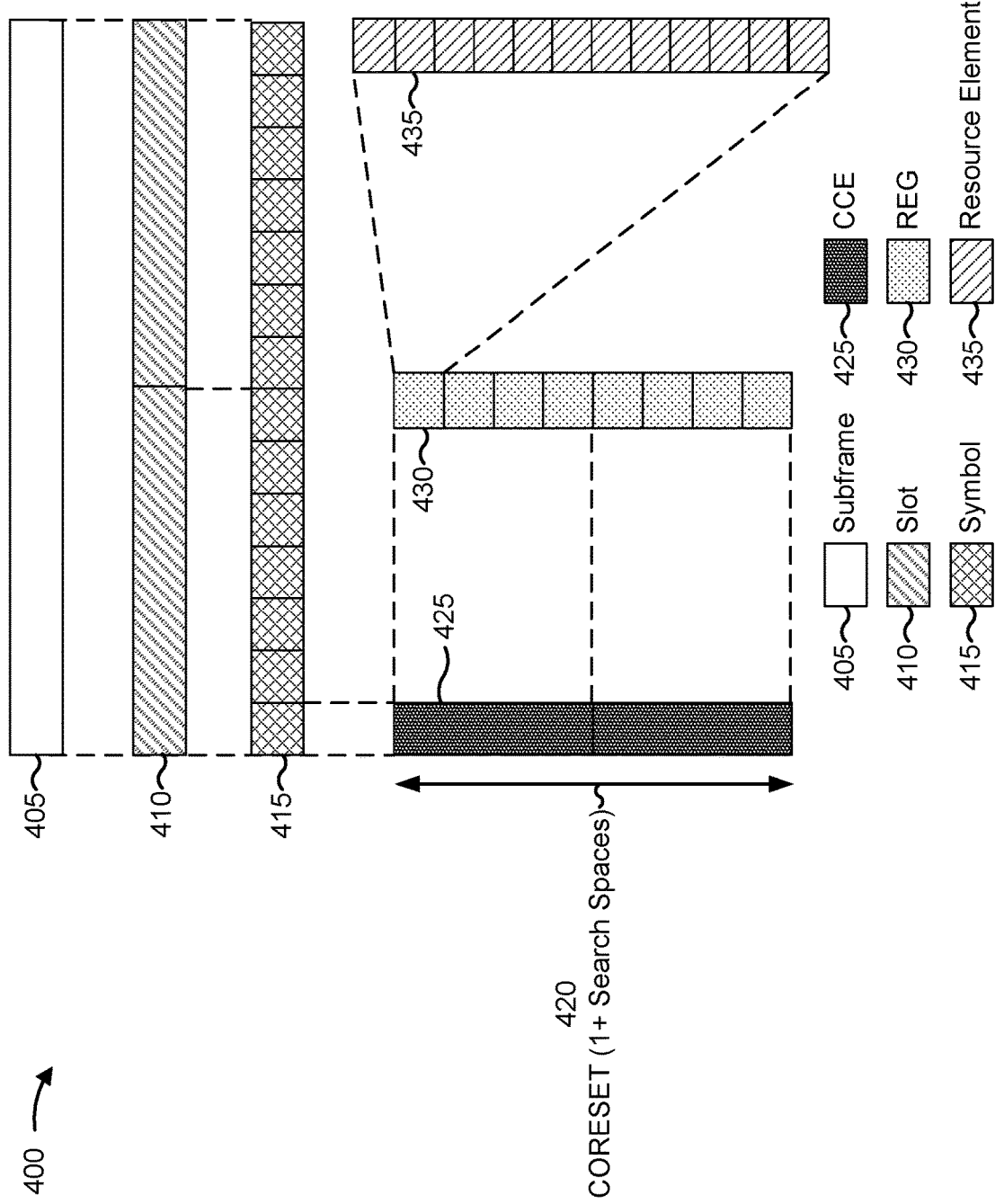
FIG. 4 is a diagram illustrating an example resource structure for wireless communication, in accordance with the present disclosure.

FIG. 4 is a diagram illustrating an example resource structure 400 for wireless communication, in accordance with the present disclosure. Resource structure 400 shows an example of various groups of resources described herein. As shown, resource structure 400 may include a subframe 405. Subframe 405 may include multiple slots 410. While resource structure 400 is shown as including 2 slots per subframe, a different number of slots may be included in a subframe (e.g., 4 slots, 8 slots, 16 slots, or 32 slots, among other examples). In some aspects, different types of transmission time intervals (TTIs) may be used, other than subframes and/or slots. A slot 410 may include multiple symbols 415, such as 7 symbols or 14 symbols per slot.

The potential control region of a slot 410 may be referred to as a control resource set (CORESET) 420 and may be structured to support an efficient use of resources, such as by flexible configuration or reconfiguration of resources of the CORESET 420 for one or more PDCCHs and/or one or more physical downlink shared channels (PDSCHs). In some aspects, the CORESET 420 may occupy the first symbol 415 of a slot 410, the first two symbols 415 of a slot 410, or the first three symbols 415 of a slot 410. Thus, a CORESET 420 may include multiple resource blocks (RBs) in the frequency domain, and either one, two, or three symbols 415 in the time domain. In 5G, a quantity of resources included in the CORESET 420 may be flexibly configured, such as by using radio resource control (RRC) signaling to indicate a frequency domain region (e.g., a quantity of resource blocks) and/or a time domain region (e.g., a quantity of symbols) for the CORESET 420.

As illustrated, a symbol 415 that includes CORESET 420 may include one or more CCEs 425, shown as two CCEs 425 as an example, that span a portion of the system bandwidth. A CCE 425 may include downlink control information (DCI) that is used to provide control information for wireless communication. A base station may transmit DCI during multiple CCEs 425 (as shown), where the quantity of CCEs 425 used for transmission of DCI represents the aggregation level (AL) used by the base station for the transmission of DCI. In FIG. 4, an aggregation level of two is shown as an example, corresponding to two CCEs 425 in a slot 410. In some aspects, different aggregation levels may be used, such as 1, 4, 8, or 16, among other examples.

Each CCE 425 may include a fixed quantity of REGs 430, shown as 4 REGs 430, or may include a variable quantity of REGs 430. In some aspects, the quantity of REGs 430 included in a CCE 425 may be specified by a REG bundle size. A REG 430 may include one resource block, which may include 12 REs 435 within a symbol 415. A RE 435 may occupy one subcarrier in the frequency domain and one OFDM symbol in the time domain.

A search space may include all possible locations (e.g., in time and/or frequency) where a PDCCH may be located. A CORESET 420 may include one or more search spaces, such as a UE-specific search space, a group-common search space, and/or a common search space. A search space may indicate a set of CCE locations where a UE may find PDCCHs that can potentially be used to transmit control information to the UE. The possible locations for a PDCCH may depend on whether the PDCCH is a UE-specific PDCCH (e.g., for a single UE) or a group-common PDCCH (e.g., for multiple UEs), and/or an aggregation level being used, among other examples. A possible location (e.g., in time and/or frequency) for a PDCCH may be referred to as a PDCCH candidate, and the set of all possible PDCCH locations may be referred to as a search space. For example, the set of all possible PDCCH locations for a particular UE may be referred to as a UE-specific search space. Similarly, the set of all possible PDCCH locations across all UEs may be referred to as a common search space. The set of all possible PDCCH locations for a particular group of UEs may be referred to as a group-common search space.

A CORESET 420 may be interleaved or non-interleaved. An interleaved CORESET 420 may have CCE-to-REG mapping such that adjacent CCEs are mapped to scattered REG bundles in the frequency domain (e.g., adjacent CCEs are not mapped to consecutive REG bundles of the CORESET 420). A non-interleaved CORESET 420 may have a CCE-to-REG mapping such that all CCEs are mapped to consecutive REG bundles (e.g., in the frequency domain) of the CORESET 420.

In 5G, a PDCCH candidate may include one or multiple CCEs, a CCE typically includes six REGs, and the number of DMRS symbols included in a REG is typically fixed at three. Currently in 5G, the locations of the three DMRS REs in a REG are fixed at the first, fifth, and ninth REs of the twelve REs in the REG. However, in some cases, such as when coverage is limited, channel estimation by a UE may become a bottleneck in the performance of PDCCH monitoring and decoding, which can adversely affect network capacity, speed, and/or reliability. In such cases, a greater density of DMRS REs in a REG of a PDCCH candidate may lead to more efficient channel estimation and PDCCH monitoring. In other cases, such as for a multi-OFDM symbol CORESET and/or when the frequency variation of the channel is almost flat, fewer number of DMRS REs in a REG of a PDCCH candidate may be sufficient for channel estimation. In such cases, reduction of DMRS REs may allow for increased DCI transmission.

Some techniques and apparatuses described herein enable a base station to set a density and locations of DMRS REs in a REG associated with a PDCCH for a UE using semi-static configuration and change the density and locations of the DMRS REs in the REG using dynamic signaling. As a result, the density of DMRS REs can be dynamically increased to improve efficiency of channel estimation and PDCCH monitoring by the UE and/or dynamically decreased to increase the amount of DCI transmitted in a PDCCH communication. This increases the efficiency of PDCCH communications, thus improving network capacity, speed, and/or reliability.

As indicated above, FIG. 4 is provided as an example. Other examples may differ from what is described with respect to FIG. 4.

Figure 5:
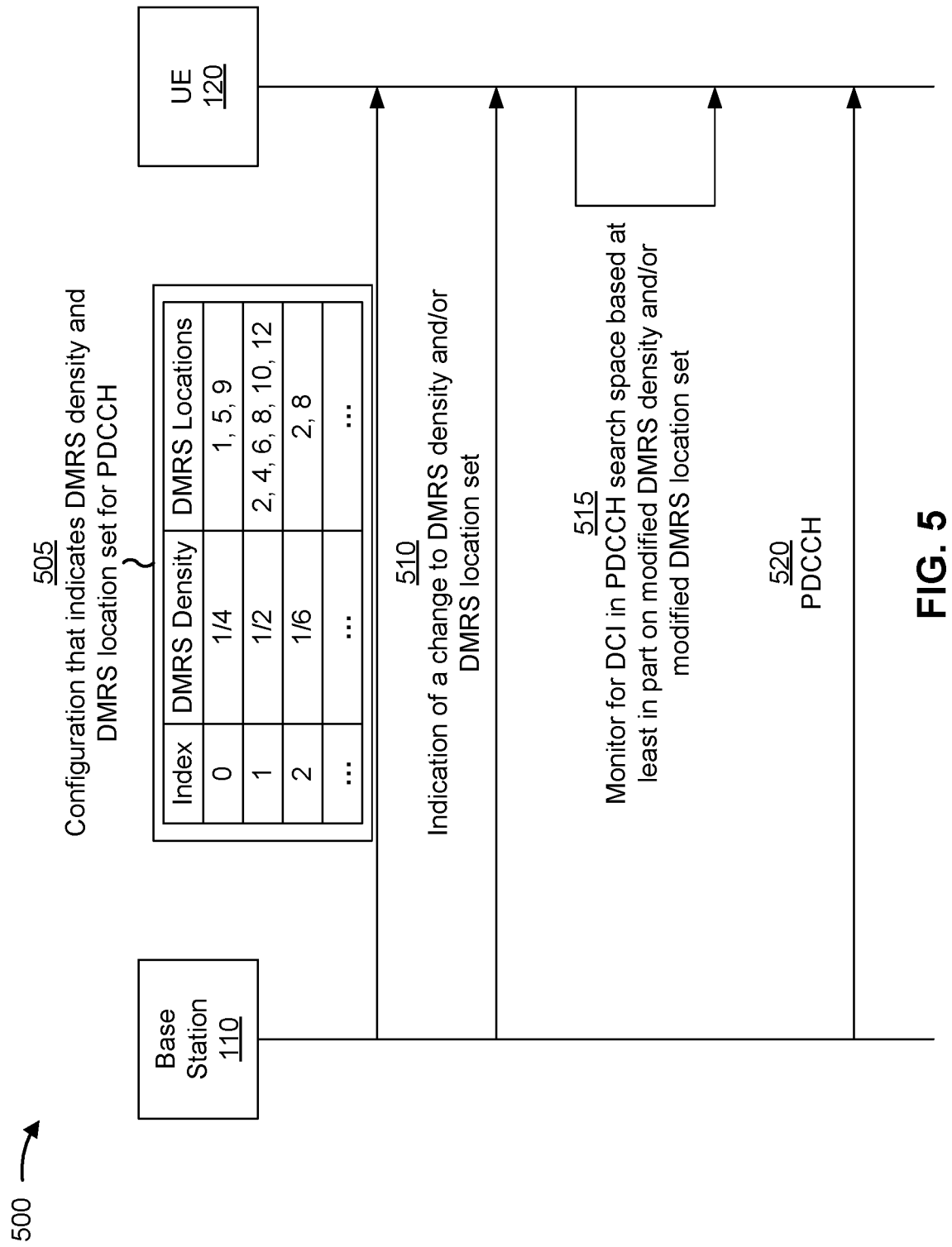
FIGS. 5-7 are diagrams illustrating examples associated with adaptive demodulation reference signal density for a physical downlink control channel, in accordance with the present disclosure.

FIG. 5 is a diagram illustrating an example 500 associated with adaptive DMRS density for a PDCCH, in accordance with the present disclosure. As shown in FIG. 5, example 500 includes communication between a base station 110 and a UE 120. The base station 110 and the UE 120 may be included in a wireless network, such as wireless network 100 illustrated and described above in connection with FIG. 1. The base station 110 and the UE 120 may communicate on a wireless access link, which may include an uplink and a downlink.

As shown in FIG. 5, and by reference number 505, the base station 110 transmits, to the UE 120, a configuration that indicates a DMRS density and a DMRS locations set for a PDCCH. For example, the base station 110 may transmit, to the UE 120, configuration information (e.g., RRC information) that is used to configure the DMRS density and the DMRS location set. The DMRS density is a density of DMRS REs in one or more REGs associated with a PDCCH. The DMRS location set is a set of locations for the DMRS REs in the one or more REGs. In some aspects, the DMRS density and/or the DMRS location set may be configured as part of a CORESET configuration for a PDCCH.

In some aspects, the configuration information may include values for the DMRS density and/or the DMRS location set. For example, the DMRS density may be specified as a ratio of DMRS REs to total REs in a REG. The DMRS location set may be specified as a list of which REs in a REG are to be used as the DMRS REs.

In some aspects, the configuration information may include a plurality of DMRS density and location options. For example, as shown in FIG. 5, the DMRS density and location options may be identified by corresponding indexes and may have corresponding DMRS densities and DMRS location sets. In the example of FIG. 5, an index of 0 corresponds to a DMRS density and location option having a DMRS density of ¼ with the first, fifth, and ninth REs of a REG used as the DMRS REs. In the example of FIG. 5, an index of 1 corresponds to a DMRS density and location option having a DMRS density of ½ with the second, fourth, sixth, eighth, tenth, and twelfth REs of a REG used as DMRS REs. In the example of FIG. 5, an index of 2 corresponds to a DMRS density and location option having a DMRS density of ⅙ with the second and eighth REs of a REG used as the DMRS REs.

The configuration information may also include an indication that identifies a DMRS density and location option from the plurality of DMRS density and location options for the UE to use for PDCCH monitoring. For example, the configuration information may include an indication of an index corresponding to the DMRS density and location option for the UE to use for PDCCH monitoring. The DMRS density and DMRS location set corresponding to the identified DMRS density and location option may be configured to be a default DMRS density and a default DMRS location set for the UE to use for PDCCH monitoring.

In some aspects, the DMRS density and location options for a REG may be based at least in part on the frequency range and/or frequency band of the REG. In some aspects, the DMRS density and location options may be based at least in part on other parameters configured for the CORESET, such as a number of OFDM symbols and/or a bandwidth (e.g., number of RBs) associated with the CORESET. In some aspects, the DMRS density and location options may include at least one high-density DMRS density and location option with a density of ½.

A multi-symbol CORESET may include REG bundles in which REGs are associated with respective OFDM symbols. The DMRS density and location options may include one or more DMRS density and location options for a REG bundle that specify DMRS densities and DMRS location sets for the REG bundle. In some aspects, the locations of the DMRS REs in a REG bundle may vary in different REGs associated with different OFDM symbols. For example, a REG bundle may include a first REG associated with a first OFDM symbol and a second REG associated with a second OFDM symbol. A DMRS density and location option for the REG bundle may include a DMRS location set that identifies different locations for the DMRS REs in the first REG and the second REG.

In some aspects, the configuration information may include a default DMRS density and location option, and one or more DMRS density and location options that are associated with one or more PDCCH monitoring options. For example, the configuration information may be used to configure DMRS density and location options associated with PDCCH coverage enhancement and/or PDCCH monitoring aggregation, among other examples. The configuration information may be used to configure the UE 120 to modify the DMRS density and DMRS location set used for PDCCH monitoring, based at least in part on an indication activating a monitoring option (e.g., PDCCH coverage enhancement and/or PDCCH monitoring aggregation), from the default DMRS density and location option to the PDCCH density and location option associated with the activated monitoring option.

As further shown in FIG. 5, and by reference number 510, the base station 110 transmits, to the UE 120, an indication of a change to the DMRS density and/or the DMRS location set. For example, the indication may be included in at least one of UE-specific DCI, group common DCI, or a medium access control (MAC) control element (MAC-CE).

In some aspects, the indication may be an explicit indication via dynamic signaling (e.g., UE-specific DCI, group common DCI, and/or MAC-CE) for the UE 120 to change the DMRS density and/or the DMRS location set. For example, in some aspects, the indication may include modified values for the DMRS density and/or modified DMRS location set. In some aspects, the indication may identify a selected DMRS density and location option from a plurality of DMRS density and location options included in the configuration information. For example, the indication may include an index value corresponding to the selected DMRS density and location option. In this case, the UE 120 may modify the DMRS density and/or the DMRS location set to the DMRS density and DMRS location set corresponding to the selected DMRS density and location option.

In some aspects, the UE 120 may be configured such that signaling sent to the UE 120 for another purpose provides an implicit indication to the UE 120 to change the DMRS density and/or DMRS location set. For example, the indication may be an indication via dynamic signaling (e.g., UE-specific DCI, group common DCI, and/or MAC-CE) to activate a PDCCH monitoring option, such as PDCCH coverage enhancement and/or PDCCH monitoring aggregation, among other examples. The configuration may include DMRS density and location options associated with one or more PDCCH monitoring options. The UE 120, based at least in part on receiving the indication to activate a PDCCH monitoring option (e.g., PDCCH coverage enhancement and/or PDCCH monitoring aggregation), may modify the DMRS density and/or DMRS location set to the DMRS density and DMRS location set associated with the activated PDCCH monitoring option.

As further shown in FIG. 5, and by reference number 515, the UE 120 monitors for DCI in a PDCCH search space based at least in part on the modified DMRS density and/or the modified DMRS location set. Based at least in part on receiving the indication, the UE 120 may modify the DMRS density and/or the modified DMRS locations set for one or more REGs associated with a PDCCH search space and monitor the PDCCH search space based at least in part on the modified DMRS density and/or the modified DMRS locations set.

The UE 120 may monitor the PDCCH search space and perform blind detection of DCI in PDCCH candidates in the PDCCH search space. In order to perform blind detection of DCI, the UE 120 may perform channel estimation for a PDCCH candidate based at least in part the modified DMRS density and/or modified DMRS location set. For example, the UE 120 may monitor the DMRS REs identified in the modified DMRS location set for DMRS symbols and perform channel estimation based on the DMRS symbols. The DMRS may then attempt to decode DCI in the remaining REs based at least in part on the estimated channel.

As further shown in FIG. 5, and by reference number 520, the base station 110 transmits a PDCCH communication to the UE 120 based at least in part on the modified DMRS density and/or the modified DMRS location set. The PDCCH communication may include one or more REGs.

The number of DMRS REs in the REGs may be determined by the modified DMRS density and the locations of the DMRS REs in the REGs may be by the modified DMRS location set. The remaining REs may be used to transmit DCI to the UE 120. The UE 120 may receive the PDCCH communication, perform channel estimation based at least in part on the DMRS REs, and decode the DCI in the remaining REs.

As described above in connection with FIG. 5, a density and locations of DMRS REs in a REG associated with a PDCCH may be configured for a UE using semi-static configuration and changed using dynamic signaling. As a result, the density of DMRS REs can be dynamically increased to improve efficiency of channel estimation and PDCCH monitoring by the UE and/or dynamically decreased to increase the amount of DCI transmitted in a PDCCH communication. This increases the efficiency of PDCCH communications, thus improving network capacity, speed, and/or reliability.

As indicated above, FIG. 5 is provided as an example. Other examples may differ from what is described with respect to FIG. 5.

Figure 6:
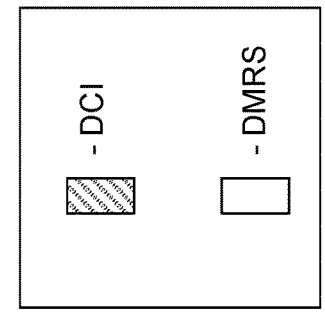
Figure 6:
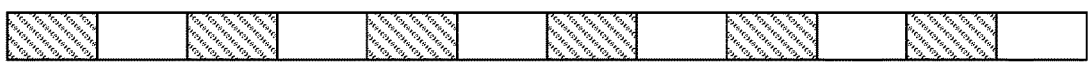

FIG. 6 is a diagram illustrating an example 600 associated with adaptive DMRS density for a PDCCH, in accordance with the present disclosure. As shown in FIG. 6, example 600 includes a REG with a DMRS density of ½. The DMRS REs in the example 600 of FIG. 6 are located in the second, fourth, sixth, eighth, tenth, and twelfth REs of the REG.

In some aspects, the DMRS density of ½ and/or the DMRS location set shown in FIG. 6 set may be set by a semi-static configuration (e.g., RRC communication) and/or included in a plurality of DMRS density and location options included in a semi-static configuration. In some aspects, the DMRS density of ½ and/or the DMRS location set shown in FIG. 6 may be dynamically selected by an indication (e.g., UE-specific DCI, group common DCI, and/or MAC-CE). In some aspects, the DMRS density of ½ and/or the DMRS location set shown in FIG. 6 may be associated with a PDCCH monitoring option, such as PDCCH enhanced coverage. In some aspects, the DMRS density of ½ may be used in cases in which coverage is limited and a high DMRS density may increase the efficiency of channel estimation by the UE.

As indicated above, FIG. 6 is provided as an example. Other examples may differ from what is described with respect to FIG. 6.

Figure 7:
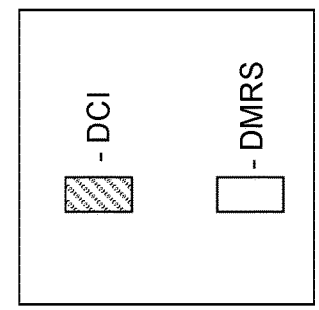
Figure 7:
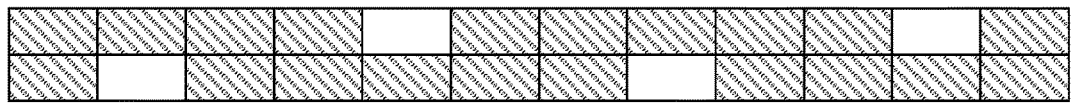

FIG. 7 is a diagram illustrating an example 700 associated with adaptive DMRS density for a PDCCH, in accordance with the present disclosure. As shown in FIG. 7, example 700 includes a REG bundle in a two-symbol CORESET with a DMRS density of ⅙. The REG bundle includes a first REG associated with a first OFDM symbol and a second REG associated with a second OFDM symbol. As described above, in some aspects, locations of the DMRS REs in a REG bundle may vary in different REGs associated with different OFDM symbols. For example, in REG bundle shown in FIG. 7, the DMRS REs are located in the second and eight REs in the first REG and located in the fifth and eleventh REs in the second REG.

In some aspects, the DMRS density of ⅙ and/or the DMRS location set for a REG bundle shown in FIG. 7 may be set by a semi-static configuration (e.g., RRC communication) and/or included in a plurality of DMRS density and location options included in a semi-static configuration. In some aspects, the DMRS density of ⅙ and/or the DMRS location set for a REG bundle shown in FIG. 7 may be dynamically selected by an indication (e.g., UE-specific DCI, group common DCI, and/or MAC-CE). In some aspects, the DMRS density of ⅙ and/or the DMRS location set for a REG bundle shown in FIG. 7 may be associated with a PDCCH monitoring option. In some aspects, the DMRS density of ⅙ and/or the DMRS location set for a REG shown in FIG. 7 bundle may be used in cases in which there is limited variation in the frequency for the channel in order to increase the amount of DCI that can be transmitted in the REG bundle.

As indicated above, FIG. 7 is provided as an example. Other examples may differ from what is described with respect to FIG. 7.

Figure 8:
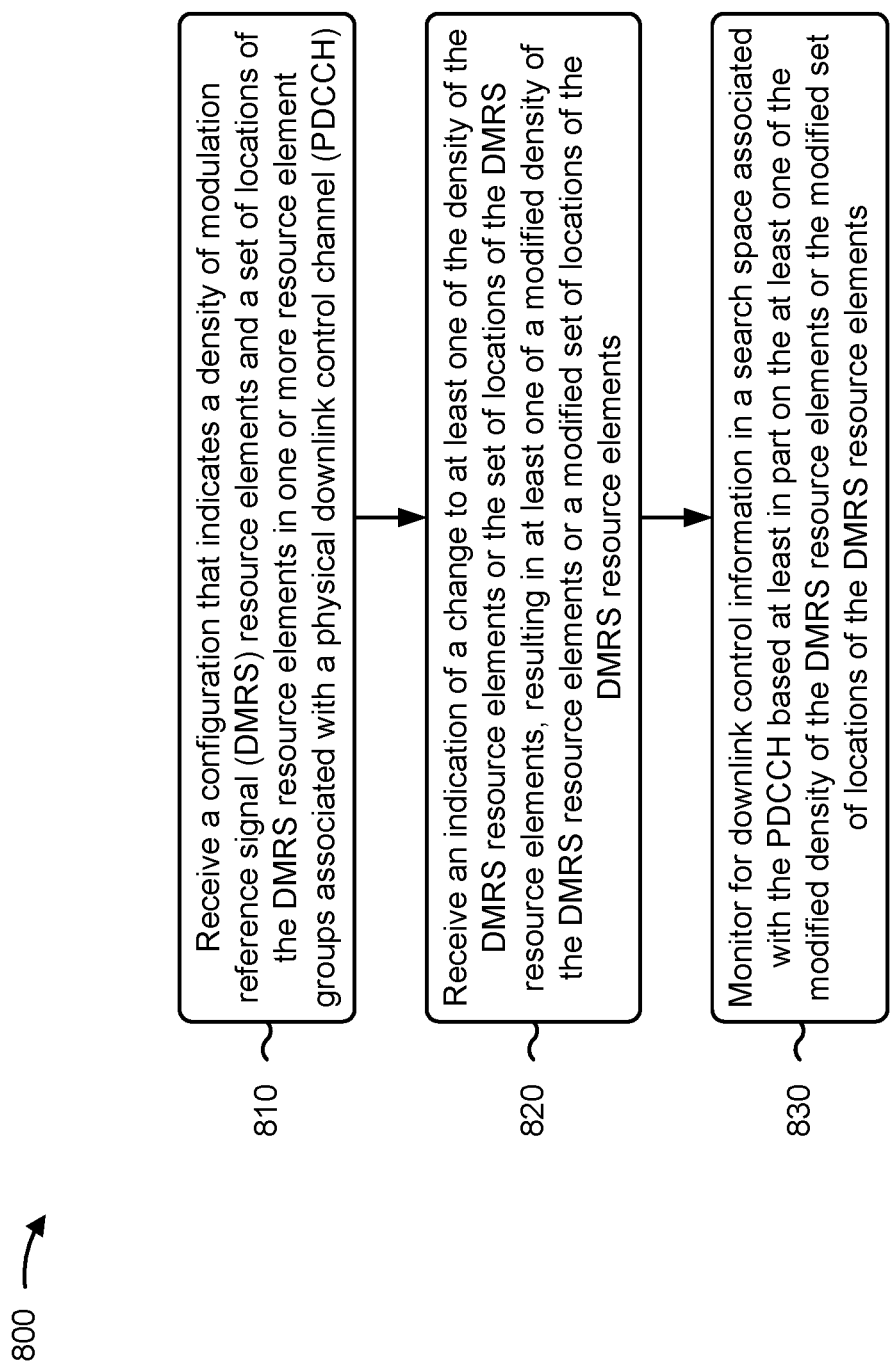
FIG. 8 is a diagram illustrating an example process performed, for example, by a UE, in accordance with the present disclosure.

FIG. 8 is a diagram illustrating an example process 800 performed, for example, by a UE, in accordance with the present disclosure. Example process 800 is an example where the UE (e.g., UE 120) performs operations associated with adaptive DMRS density for a PDCCH.

As shown in FIG. 8, in some aspects, process 800 may include receiving a configuration that indicates a density of DMRS resource elements and a set of locations of the DMRS resource elements in one or more resource element groups associated with a PDCCH (block 810). For example, the UE (e.g., using receive processor 258, transmit processor 264, controller/processor 280, and/or memory 282) may receive a configuration that indicates a density of DMRS resource elements and a set of locations of the DMRS resource elements in one or more resource element groups associated with a PDCCH, as described above.

As further shown in FIG. 8, in some aspects, process 800 may include receiving an indication of a change to at least one of the density of the DMRS resource elements, the set of locations of the DMRS resource elements, or a combination thereof, resulting in at least one of a modified density of the DMRS resource elements, a modified set of locations of the DMRS resource elements, or a combination thereof (block 820). For example, the UE (e.g., using receive processor 258, transmit processor 264, controller/processor 280, and/or memory 282) may receive an indication of a change to at least one of the density of the DMRS resource elements, the set of locations of the DMRS resource elements, or a combination thereof, resulting in at least one of a modified density of the DMRS resource elements, a modified set of locations of the DMRS resource elements, or a combination thereof, as described above.

As further shown in FIG. 8, in some aspects, process 800 may include monitoring for downlink control information in a search space associated with the PDCCH based at least in part on the at least one of the modified density of the DMRS resource elements, the modified set of locations of the DMRS resource elements, or a combination thereof (block 830). For example, the UE (e.g., using receive processor 258, transmit processor 264, controller/processor 280, and/or memory 282) may monitor for downlink control information in a search space associated with the PDCCH based at least in part on the at least one of the modified density of the DMRS resource elements, the modified set of locations of the DMRS resource elements, or a combination thereof, as described above.

Process 800 may include additional aspects, such as any single aspect or any combination of aspects described below and/or in connection with one or more other processes described elsewhere herein.

In a first aspect, monitoring for downlink control information comprises: performing channel estimation based at least in part on the at least one of the modified density of the DMRS resource elements, the modified set of locations of the DMRS resource elements, or a combination thereof.

In a second aspect, alone or in combination with the first aspect, the configuration is a control resource set configuration associated with the PDCCH.

In a third aspect, alone or in combination with one or more of the first and second aspects, the indication is included in at least one of UE-specific DCI, group common DCI, a MAC-CE, or a combination thereof.

In a fourth aspect, alone or in combination with one or more of the first through third aspects, the indication is an indication to change the at least one of the density of the DMRS resource elements, the set of locations of the DMRS resource elements, or a combination thereof.

In a fifth aspect, alone or in combination with one or more of the first through fourth aspects, the configuration includes a plurality of DMRS density and location options having corresponding DMRS densities of the DMRS resource elements and sets of locations of the DMRS resource elements.

In a sixth aspect, alone or in combination with one or more of the first through fifth aspects, the indication indicates a selected DMRS density and location option of the plurality DMRS density and location options.

In a seventh aspect, alone or in combination with one or more of the first through sixth aspects, the density of the DMRS resource elements is changed to a density of the DMRS resource elements corresponding to the selected DMRS density and location option, and the set of locations of the DMRS resource elements is changed to a set of locations corresponding to the selected DMRS density and location option.

In an eighth aspect, alone or in combination with one or more of the first through seventh aspects, the plurality of DMRS density and location options include a first DMRS density and location option and a second DMRS density and location option, and the configuration sets the density of the DMRS resource elements to a first density corresponding to the first DMRS density and location option and sets the set of locations of the DMRS resource elements to a first set of locations corresponding to the first DMRS density and location option.

In a ninth aspect, alone or in combination with one or more of the first through eighth aspects, the indication indicates the second DMRS density and location option, and the indication causes the density of the DMRS resource elements to be changed to a second density corresponding to the second DMRS density and location option and causes the set of locations of the DMRS resource elements to be changed to a second set of locations corresponding to the second DMRS density and location option.

In a tenth aspect, alone or in combination with one or more of the first through ninth aspects, the plurality of DMRS density and location options are based at least in part on at least one of a frequency range of the one or more resource element groups, a frequency band of the one or more resource element groups, or a combination thereof.

In an eleventh aspect, alone or in combination with one or more of the first through tenth aspects, the configuration is a control resource set configuration and the plurality of DMRS density and location options are based at least in part on a number of orthogonal frequency division multiplexing symbols associated with the control resource set, a bandwidth of the control resource set, a number of resource blocks associated with the control resource set, or a combination thereof.

In a twelfth aspect, alone or in combination with one or more of the first through eleventh aspects, the plurality of DMRS density and location options includes a DMRS density and location option for which a corresponding density of the DMRS resource elements is ½.

In a thirteenth aspect, alone or in combination with one or more of the first through twelfth aspects, the one or more resource element groups include a resource element group bundle including a first resource element group associated with a first orthogonal frequency division multiplexing symbol and a second resource element group associated with a second orthogonal frequency division multiplexing symbol, and the plurality of DMRS density and location options includes a DMRS density and location option for which a corresponding set of locations of the DMRS resource elements includes a different locations in the first resource element group and the second resource element group of the resource element group bundle.

In a fourteenth aspect, alone or in combination with one or more of the first through thirteenth aspects, the indication indicates a PDCCH monitoring option, and the at least one of the density of the DMRS resource elements, the set of locations of the DMRS resource elements, or a combination thereof is changed based at least in part on the indication of the PDCCH monitoring option.

In a fifteenth aspect, alone or in combination with one or more of the first through fourteenth aspects, the configuration indicates an associated density of the DMRS resource elements for the PDCCH monitoring option and an associated set of locations of the DMRS resource elements for the PDCCH monitoring option, and the density of the DMRS resource elements is changed to the associated density of the DMRS resource elements for the PDCCH monitoring option and the set of locations of the DMRS resource elements is changed to the associated set of locations of the DMRS resource elements for the PDCCH monitoring option.

In a sixteenth aspect, alone or in combination with one or more of the first through fifteenth aspects, the indication is an indication to activate PDCCH coverage enhancement.

In a seventeenth aspect, alone or in combination with one or more of the first through sixteenth aspects, the indication is an indication to activate PDCCH monitoring aggregation.

In an eighteenth aspect, alone or in combination with one or more of the first through seventeenth aspects, the indication causes a change to the density of the DMRS resource elements, resulting in the modified density of the DMRS resource elements of ½.

In a nineteenth aspect, alone or in combination with one or more of the first through eighteenth aspects, the one or more resource element groups include a resource element group bundle including a first resource element group associated with a first orthogonal frequency division multiplexing symbol and a second resource element group associated with a second orthogonal frequency division multiplexing symbol, and the indication causes a change to a density of DMRS resource elements of the resource element group bundle, resulting in a modified density of the DMRS resource elements of the resource element group bundle of ⅙.

In a twentieth aspect, alone or in combination with one or more of the first through nineteenth aspects, the indication causes a change to a set of locations of the DMRS resources of the resource element group bundle, resulting in a modified set of locations of the DMRS resource elements of the resource element group bundle including different locations of the DMRS resource elements in the first resource element group and the second resource element group of the resource element group bundle.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
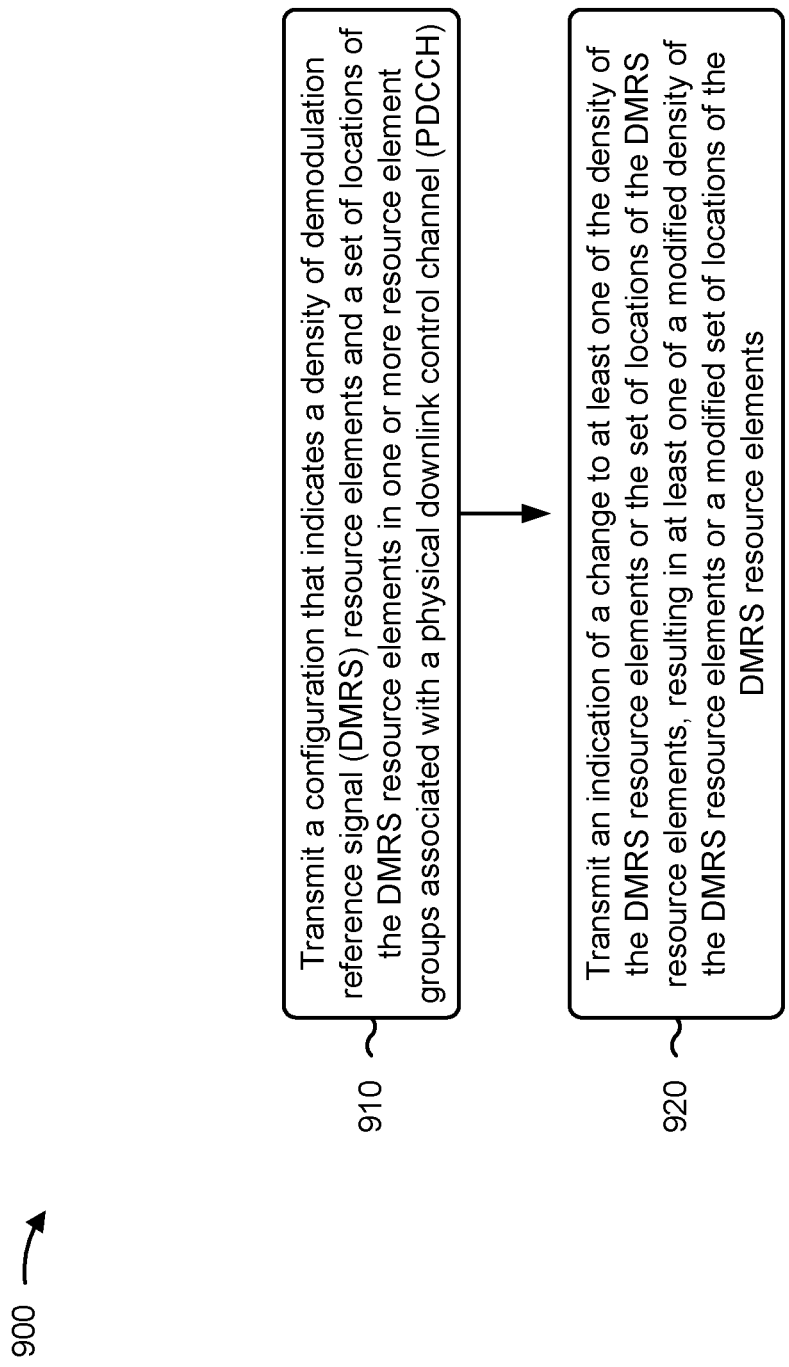
FIG. 9 is a diagram illustrating an example process performed, for example, by a base station, in accordance with the present disclosure.

FIG. 9 is a diagram illustrating an example process 900 performed, for example, by a base station, in accordance with the present disclosure. Example process 900 is an example where the base station (e.g., base station 110) performs operations associated with adaptive DMRS density for PDCCH.

As shown in FIG. 9, in some aspects, process 900 may include transmitting, to a UE, a configuration that indicates a density of DMRS resource elements and a set of locations of the DMRS resource elements in one or more resource element groups associated with a PDCCH (block 910). For example, the base station (e.g., using transmit processor 220, receive processor 238, controller/processor 240, and/or memory 242) may transmit, to a UE, a configuration that indicates a density of DMRS resource elements and a set of locations of the DMRS resource elements in one or more resource element groups associated with a PDCCH, as described above.

As further shown in FIG. 9, in some aspects, process 900 may include transmitting, to the UE, an indication of a change to at least one of the density of the DMRS resource elements, the set of locations of the DMRS resource elements, or a combination thereof, resulting in at least one of a modified density of the DMRS resource elements, a modified set of locations of the DMRS resource elements, or a combination thereof (block 920). For example, the base station (e.g., using transmit processor 220, receive processor 238, controller/processor 240, and/or memory 242) may transmit, to the UE, an indication of a change to at least one of the density of the DMRS resource elements, the set of locations of the DMRS resource elements, or a combination thereof, resulting in at least one of a modified density of the DMRS resource elements, a modified set of locations of the DMRS resource elements, or a combination thereof, as described above.

Process 900 may include additional aspects, such as any single aspect or any combination of aspects described below and/or in connection with one or more other processes described elsewhere herein.

In a first aspect, process 900 includes transmitting, to the UE, downlink control information in the PDCCH using the one or more resource element groups based at least on part on the at least one of the modified density of the DMRS resource elements, the modified set of locations of the DMRS resource elements, or a combination thereof.

In a second aspect, alone or in combination with the first aspect, the configuration is a control resource set configuration associated with the PDCCH.

In a third aspect, alone or in combination with one or more of the first and second aspects, the indication is included in at least one of UE-specific DCI, group common DCI, a MAC-CE, or a combination thereof.

In a fourth aspect, alone or in combination with one or more of the first through third aspects, the indication is an indication to change the at least one of the density of the DMRS resource elements, the set of locations of the DMRS resource elements, or a combination thereof.

In a fifth aspect, alone or in combination with one or more of the first through fourth aspects, the configuration includes a plurality of DMRS density and location options having corresponding DMRS densities of the DMRS resource elements and sets of locations of the DMRS resource elements.

In a sixth aspect, alone or in combination with one or more of the first through fifth aspects, the indication indicates a selected DMRS density and location option of the plurality DMRS density and location options.

In a seventh aspect, alone or in combination with one or more of the first through sixth aspects, the density of the DMRS resource elements is changed to a density of the DMRS resource elements corresponding to the selected DMRS density and location option, and the set of locations of the DMRS resource elements is changed to a set of locations corresponding to the selected DMRS density and location option.

In an eighth aspect, alone or in combination with one or more of the first through seventh aspects, the plurality of DMRS density and location options include a first DMRS density and location option and a second DMRS density and location option, and the configuration sets the density of the DMRS resource elements to a first density corresponding to the first DMRS density and location option and sets the set of locations of the DMRS resource elements to a first set of locations corresponding to the first DMRS density and location option.

In a ninth aspect, alone or in combination with one or more of the first through eighth aspects, the indication indicates the second DMRS density and location option, and the indication causes the density of the DMRS resource elements to be changed to a second density corresponding to the second DMRS density and location option and causes the set of locations of the DMRS resource elements to be changed to a second set of locations corresponding to the second DMRS density and location option In a tenth aspect, alone or in combination with one or more of the first through ninth aspects, the plurality of DMRS density and location options are based at least in part on at least one of a frequency range of the one or more resource element groups, a frequency band of the one or more resource element groups, or a combination thereof.

In an eleventh aspect, alone or in combination with one or more of the first through tenth aspects, the configuration is a control resource set configuration and the plurality of DMRS density and location options are based at least in part on a number of orthogonal frequency division multiplexing symbols associated with the control resource set, a bandwidth of the control resource set, a number of resource blocks associated with the control resource set, or a combination thereof.

In a twelfth aspect, alone or in combination with one or more of the first through eleventh aspects, the plurality of DMRS density and location options includes a DMRS density and location option for which a corresponding density of the DMRS resource elements is ½.

In a thirteenth aspect, alone or in combination with one or more of the first through twelfth aspects, the one or more resource element groups include a resource element group bundle including a first resource element group associated with a first OFDM symbol and a second resource element group associated with a second OFDM symbol, and wherein the plurality of DMRS density and location options includes a DMRS density and location option for which a corresponding set of locations of the DMRS resource elements includes a different locations in the first resource element group and the second resource element group of the resource element group bundle.

In a fourteenth aspect, alone or in combination with one or more of the first through thirteenth aspects, the indication indicates a PDCCH monitoring option, and the at least one of the density of the DMRS resource elements, the set of locations of the DMRS resource elements, or a combination thereof is changed based at least in part on the indication of the PDCCH monitoring option.

In a fifteenth aspect, alone or in combination with one or more of the first through fourteenth aspects, the configuration indicates an associated density of the DMRS resource elements for the PDCCH monitoring option and an associated set of locations of the DMRS resource elements for the PDCCH monitoring option, and the density of the DMRS resource elements is changed to the associated density of the DMRS resource elements for the PDCCH monitoring option and the set of locations of the DMRS resource elements is changed to the associated set of locations of the DMRS resource elements for the PDCCH monitoring option.

In a sixteenth aspect, alone or in combination with one or more of the first through fifteenth aspects, the indication is an indication to activate PDCCH coverage enhancement.

In a seventeenth aspect, alone or in combination with one or more of the first through sixteenth aspects, the indication is an indication to activate PDCCH monitoring aggregation.

In an eighteenth aspect, alone or in combination with one or more of the first through seventeenth aspects, the indication causes a change to the density of the DMRS resource elements, resulting in the modified density of the DMRS resource elements of ½.

In a nineteenth aspect, alone or in combination with one or more of the first through eighteenth aspects, the one or more resource element groups include a resource element group bundle including a first resource element group associated with a first orthogonal frequency division multiplexing symbol and a second resource element group associated with a second orthogonal frequency division multiplexing symbol, and the indication causes a change to a density of DMRS resource elements of the resource element group bundle, resulting in a modified density of the DMRS resource elements of the resource element group bundle of ⅙.

In a twentieth aspect, alone or in combination with one or more of the first through nineteenth aspects, the indication causes a change to a set of locations of the DMRS resources of the resource element group bundle, resulting in a modified set of locations of the DMRS resource elements of the resource element group bundle including different locations of the DMRS resource elements in the first resource element group and the second resource element group of the resource element group bundle.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

The following provides an overview of some Aspects of the present disclosure:

Aspect 1: A method of wireless communication performed by a user equipment (UE), comprising: receiving a configuration that indicates a density of demodulation reference signal (DMRS) resource elements and a set of locations of the DMRS resource elements in one or more resource element groups associated with a physical downlink control channel (PDCCH); receiving an indication of a change to at least one of the density of the DMRS resource elements or the set of locations of the DMRS resource elements, resulting in at least one of a modified density of the DMRS resource elements or a modified set of locations of the DMRS resource elements; and monitoring for downlink control information in a search space associated with the PDCCH based at least in part on the at least one of the modified density of the DMRS resource elements or the modified set of locations of the DMRS resource elements.

Aspect 2: The method of Aspect 1, wherein monitoring for downlink control information comprises: performing channel estimation based at least in part on the at least one of the modified density of the DMRS resource elements or the modified set of locations of the DMRS resource elements.

Aspect 3: The method of any of Aspects 1-2, wherein the configuration is a control resource set configuration associated with the PDCCH.

Aspect 4: The method of any of Aspects 1-3, wherein the indication is included in at least one of UE-specific downlink control information or group common downlink control information, a medium access control (MAC) control element.

Aspect 5: The method of any of Aspects 1-4, wherein the indication is an indication to change the at least one of the density of the DMRS resource elements or the set of locations of the DMRS resource elements.

Aspect 6: The method of any of Aspects 1-5, wherein the configuration includes a plurality of DMRS density and location options having corresponding DMRS densities of the DMRS resource elements and sets of locations of the DMRS resource elements.

Aspect 7: The method of Aspect 6, wherein the indication indicates a selected DMRS density and location option of the plurality DMRS density and location options.

Aspect 8: The method of Aspect 7, wherein the modified density of the DMRS resource elements is a density of the DMRS resource elements corresponding to the selected DMRS density and location option and the modified set of locations of the DMRS resource elements is a set of locations corresponding to the selected DMRS density and location option.

Aspect 9: The method of any of Aspects 6-8, wherein the plurality of DMRS density and location options include a first DMRS density and location option and a second DMRS density and location option, and wherein the configuration sets the density of the DMRS resource elements to a first density corresponding to the first DMRS density and location option and sets the set of locations of the DMRS resource elements to a first set of locations corresponding to the first DMRS density and location option.

Aspect 10: The method of Aspect 9, wherein the indication indicates the second DMRS density and location option, and wherein the modified density of the DMRS resource elements is a second density corresponding to the second DMRS density and location option and the modified set of locations of the DMRS resource elements is a second set of locations corresponding to the second DMRS density and location option.

Aspect 11: The method of any of Aspects 6-10, wherein the plurality of DMRS density and location options are based at least in part on at least one of a frequency range of the one or more resource element groups or a frequency band of the one or more resource element groups.

Aspect 12: The method of any of Aspects 6-11, wherein the configuration is a control resource set configuration and the plurality of DMRS density and location options are based at least in part on a number of orthogonal frequency division multiplexing symbols associated with the control resource set, a bandwidth of the control resource set, or a number of resource blocks associated with the control resource set.

Aspect 13: The method of any of Aspects 6-12, wherein the plurality of DMRS density and location options includes a DMRS density and location option for which a corresponding density of the DMRS resource elements is ½.

Aspect 14: The method of any of Aspects 6-13, wherein the one or more resource element groups include a resource element group bundle including a first resource element group associated with a first orthogonal frequency division multiplexing symbol and a second resource element group associated with a second orthogonal frequency division multiplexing symbol, and wherein the plurality of DMRS density and location options includes a DMRS density and location option for which a corresponding set of locations of the DMRS resource elements includes a different locations in the first resource element group and the second resource element group of the resource element group bundle.

Aspect 15: The method of any of Aspects 1-4, wherein the indication indicates a PDCCH monitoring option, and the at least one of the modified density of the DMRS resource elements or the modified set of locations of the DMRS resource elements is based at least in part on the indication of the PDCCH monitoring option.

Aspect 16: The method of Aspect 15, wherein the configuration indicates an associated density of the DMRS resource elements for the PDCCH monitoring option and an associated set of locations of the DMRS resource elements for the PDCCH monitoring option, and wherein the modified density of the DMRS resource elements is the associated density of the DMRS resource elements for the PDCCH monitoring option and the modified set of locations of the DMRS resource elements is the associated set of locations of the DMRS resource elements for the PDCCH monitoring option.

Aspect 17: The method of any of Aspects 15-16, wherein the indication is an indication to activate PDCCH coverage enhancement.

Aspect 18: The method of any of Aspects 15-16, wherein the indication is an indication to activate PDCCH monitoring aggregation.

Aspect 19: The method of any of Aspects 1-18, wherein the indication causes a change to the density of the DMRS resource elements, resulting in the modified density of the DMRS resource elements of ½.

Aspect 20: The method of any of Aspects 1-18, wherein the one or more resource element groups include a resource element group bundle including a first resource element group associated with a first orthogonal frequency division multiplexing symbol and a second resource element group associated with a second orthogonal frequency division multiplexing symbol, and the indication causes a change to a density of DMRS resource elements of the resource element group bundle, resulting in a modified density of the DMRS resource elements of the resource element group bundle of ⅙.

Aspect 21: The method of Aspect 20, wherein the indication causes a change to a set of locations of the DMRS resources of the resource element group bundle, resulting in a modified set of locations of the DMRS resource elements of the resource element group bundle including different locations of the DMRS resource elements in the first resource element group and the second resource element group of the resource element group bundle.

Aspect 22: A method of wireless communication performed by a base station, comprising: transmitting, to a user equipment (UE), a configuration that indicates a density of demodulation reference signal (DMRS) resource elements and a set of locations of the DMRS resource elements in one or more resource element groups associated with a physical downlink control channel (PDCCH); and transmitting, to the UE, an indication of a change to at least one of the density of the DMRS resource elements or the set of locations of the DMRS resource elements, resulting in at least one of a modified density of the DMRS resource elements or a modified set of locations of the DMRS resource elements.

Aspect 23: The method of Aspect 22, further comprising: transmitting, to the UE, downlink control information in the PDCCH using the one or more resource element groups based at least on part on the at least one of the modified density of the DMRS resource elements or the modified set of locations of the DMRS resource elements.

Aspect 24: The method of any of Aspects 22-23, wherein the configuration is a control resource set configuration associated with the PDCCH.

Aspect 25: The method of any of Aspects 22-24, wherein the indication is included in at least one of UE-specific downlink control information, group common downlink control information, or a medium access control (MAC) control element.

Aspect 26: The method of any of Aspects 22-25, wherein the indication is an indication to change the at least one of the density of the DMRS resource elements or the set of locations of the DMRS resource elements.

Aspect 27: The method of any of Aspects 22-26, wherein the configuration includes a plurality of DMRS density and location options having corresponding DMRS densities of the DMRS resource elements and sets of locations of the DMRS resource elements.

Aspect 28: The method of Aspect 27, wherein the indication indicates a selected DMRS density and location option of the plurality DMRS density and location options.

Aspect 29: The method of Aspect 28, wherein the density of the DMRS resource elements is changed to a density of the DMRS resource elements corresponding to the selected DMRS density and location option, and the set of locations of the DMRS resource elements is changed to a set of locations corresponding to the selected DMRS density and location option.

Aspect 30: The method of any of Aspects 27-29, wherein the plurality of DMRS density and location options include a first DMRS density and location option and a second DMRS density and location option, and wherein the configuration sets the density of the DMRS resource elements to a first density corresponding to the first DMRS density and location option and sets the set of locations of the DMRS resource elements to a first set of locations corresponding to the first DMRS density and location option.

Aspect 31: The method of Aspect 30, wherein the indication indicates the second DMRS density and location option, and wherein the indication causes the density of the DMRS resource elements to be changed to a second density corresponding to the second DMRS density and location option and causes the set of locations of the DMRS resource elements to be changed to a second set of locations corresponding to the second DMRS density and location option.

Aspect 32: The method of any of Aspects 27-31, wherein the plurality of DMRS density and location options are based at least in part on at least one of a frequency range of the one or more resource element groups or a frequency band of the one or more resource element groups.

Aspect 33: The method of any of Aspects 27-32, wherein the configuration is a control resource set configuration and the plurality of DMRS density and location options are based at least in part on a number of orthogonal frequency division multiplexing symbols associated with the control resource set, a bandwidth of the control resource set, or a number of resource blocks associated with the control resource set.

Aspect 34: The method of any of Aspects 27-33, wherein the plurality of DMRS density and location options includes a DMRS density and location option for which a corresponding density of the DMRS resource elements is ½.

Aspect 35: The method of any of Aspects 27-33, wherein the one or more resource element groups include a resource element group bundle including a first resource element group associated with a first orthogonal frequency division multiplexing symbol and a second resource element group associated with a second orthogonal frequency division multiplexing symbol, and wherein the plurality of DMRS density and location options includes a DMRS density and location option for which a corresponding set of locations of the DMRS resource elements includes a different locations in the first resource element group and the second resource element group of the resource element group bundle.

Aspect 36: The method of any of Aspects 22-24, wherein the indication indicates a PDCCH monitoring option, and the at least one of the density of the DMRS resource elements or the set of locations of the DMRS resource elements is changed based at least in part on the indication of the PDCCH monitoring option.

Aspect 37: The method of Aspect 36, wherein the configuration indicates an associated density of the DMRS resource elements for the PDCCH monitoring option and an associated set of locations of the DMRS resource elements for the PDCCH monitoring option, and wherein the density of the DMRS resource elements is changed to the associated density of the DMRS resource elements for the PDCCH monitoring option and the set of locations of the DMRS resource elements is changed to the associated set of locations of the DMRS resource elements for the PDCCH monitoring option.

Aspect 38: The method of any of Aspects 36-37, wherein the indication is an indication to activate PDCCH coverage enhancement.

Aspect 39: The method of any of Aspects 36-27, wherein the indication is an indication to activate PDCCH monitoring aggregation.

Aspect 40: The method of any of Aspects 22-39, wherein the indication causes a change to the density of the DMRS resource elements, resulting in the modified density of the DMRS resource elements of ½.

Aspect 41: The method of any of Aspects 22-39, wherein the one or more resource element groups include a resource element group bundle including a first resource element group associated with a first orthogonal frequency division multiplexing symbol and a second resource element group associated with a second orthogonal frequency division multiplexing symbol, and the indication causes a change to a density of DMRS resource elements of the resource element group bundle, resulting in a modified density of the DMRS resource elements of the resource element group bundle of ⅙.

Aspect 42: The method of Aspect 41, wherein the indication causes a change to a set of locations of the DMRS resources of the resource element group bundle, resulting in a modified set of locations of the DMRS resource elements of the resource element group bundle including different locations of the DMRS resource elements in the first resource element group and the second resource element group of the resource element group bundle.

Aspect 43: An apparatus for wireless communication at a device, comprising a processor; memory coupled with the processor; and instructions stored in the memory and executable by the processor to cause the apparatus to perform the method of one or more of Aspects 1-21.

Aspect 44: An apparatus for wireless communication at a device, comprising a processor; memory coupled with the processor; and instructions stored in the memory and executable by the processor to cause the apparatus to perform the method of one or more of Aspects 22-42.

Aspect 45: A device for wireless communication, comprising a memory and one or more processors coupled to the memory, the one or more processors configured to perform the method of one or more of Aspects 1-21.

Aspect 46: A device for wireless communication, comprising a memory and one or more processors coupled to the memory, the one or more processors configured to perform the method of one or more of Aspects 22-42.

Aspect 47: An apparatus for wireless communication, comprising at least one means for performing the method of one or more of Aspects 1-21.

Aspect 48: An apparatus for wireless communication, comprising at least one means for performing the method of one or more of Aspects 22-42.

Aspect 49: A non-transitory computer-readable medium storing code for wireless communication, the code comprising instructions executable by a processor to perform the method of one or more of Aspects 1-21.

Aspect 50: A non-transitory computer-readable medium storing code for wireless communication, the code comprising instructions executable by a processor to perform the method of one or more of Aspects 22-42.

Aspect 51: A non-transitory computer-readable medium storing a set of instructions for wireless communication, the set of instructions comprising one or more instructions that, when executed by one or more processors of a device, cause the device to perform the method of one or more of Aspects 1-21.

Aspect 52: A non-transitory computer-readable medium storing a set of instructions for wireless communication, the set of instructions comprising one or more instructions that, when executed by one or more processors of a device, cause the device to perform the method of one or more of Aspects 22-42. The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:
   receiving a configuration that indicates a density of demodulation reference signal (DMRS) resource elements and a set of locations of the DMRS resource elements in one or more resource element groups associated with a physical downlink control channel (PDCCH);
   receiving an indication of a selected DMRS density and location option from a plurality of DMRS density and location options, the indication further being of a change to at least one of the density of the DMRS resource elements or the set of locations of the DMRS resource elements, resulting in at least one of a modified density of the DMRS resource elements or a modified set of locations of the DMRS resource elements, wherein the modified density of the DMRS resource elements and the modified set of locations of the DMRS resource elements correspond to the selected DMRS density and location option; and
   monitoring for downlink control information in a search space associated with the PDCCH based at least in part on the at least one of the modified density of the DMRS resource elements or the modified set of locations of the DMRS resource elements.

2. The method of claim 1, wherein the indication is an indication to change the at least one of the density of the DMRS resource elements or the set of locations of the DMRS resource elements.

3. The method of claim 1, wherein the configuration includes the plurality of DMRS density and location options having corresponding DMRS densities of the DMRS resource elements and sets of locations of the DMRS resource elements, and wherein the indication indicates the selected DMRS density and location option of the plurality of DMRS density and location options.

4. The method of claim 3, wherein the plurality of DMRS density and location options include a first DMRS density and location option and a second DMRS density and location option, and wherein the configuration sets the density of the DMRS resource elements to a first density corresponding to the first DMRS density and location option and sets the set of locations of the DMRS resource elements to a first set of locations corresponding to the first DMRS density and location option.

5. The method of claim 4, wherein the indication indicates the second DMRS density and location option, and wherein the modified density of the DMRS resource elements is a second density corresponding to the second DMRS density and location option and the modified set of locations of the DMRS resource elements is a second set of locations corresponding to the second DMRS density and location option.

6. The method of claim 3, wherein the plurality of DMRS density and location options are based at least in part on at least one of a frequency range of the one or more resource element groups or a frequency band of the one or more resource element groups.

7. The method of claim 3, wherein the configuration is a control resource set configuration and the plurality of DMRS density and location options are based at least in part on a number of orthogonal frequency division multiplexing symbols associated with the control resource set, a bandwidth of the control resource set, or a number of resource blocks associated with the control resource set.

8. The method of claim 3, wherein the plurality of DMRS density and location options includes a DMRS density and location option for which a corresponding density of the DMRS resource elements is ½.

9. The method of claim 3, wherein the one or more resource element groups include a resource element group bundle including a first resource element group associated with a first orthogonal frequency division multiplexing symbol and a second resource element group associated with a second orthogonal frequency division multiplexing symbol, and wherein the plurality of DMRS density and location options includes a DMRS density and location option for which a corresponding set of locations of the DMRS resource elements includes different locations in the first resource element group and the second resource element group of the resource element group bundle.

10. The method of claim 1, wherein the indication indicates a PDCCH monitoring option, and the at least one of the modified density of the DMRS resource elements or the modified set of locations of the DMRS resource elements is based at least in part on the indication of the PDCCH monitoring option.

11. The method of claim 10, wherein the configuration indicates an associated density of the DMRS resource elements for the PDCCH monitoring option and an associated set of locations of the DMRS resource elements for the PDCCH monitoring option, and wherein the modified density of the DMRS resource elements is the associated density of the DMRS resource elements for the PDCCH monitoring option and the modified set of locations of the DMRS resource elements is the associated set of locations of the DMRS resource elements for the PDCCH monitoring option.

12. The method of claim 1, wherein monitoring for the downlink control information comprises:
performing channel estimation based at least in part on the at least one of the modified density of the DMRS resource elements or the modified set of locations of the DMRS resource elements.

13. The method of claim 1, wherein the configuration is a control resource set configuration associated with the PDCCH.

14. A user equipment (UE) for wireless communication, comprising:
memory;
one or more processors coupled to the memory; and
instructions stored in the memory and operable, when executed by the one or more processors, to cause the UE to:
receive a configuration that indicates a density of demodulation reference signal (DMRS) resource elements and a set of locations of the DMRS resource elements in one or more resource element groups associated with a physical downlink control channel (PDCCH);
receive an indication of a selected DMRS density and location option from a plurality of DMRS density and location options, the indication further being of a change to at least one of the density of the DMRS resource elements or the set of locations of the DMRS resource elements, resulting in at least one of a modified density of the DMRS resource elements or a modified set of locations of the DMRS resource elements, wherein the modified density of the DMRS resource elements and the modified set of locations of the DMRS resource elements correspond to the selected DMRS density and location option; and
monitor for downlink control information in a search space associated with the PDCCH based at least in part on the at least one of the modified density of the DMRS resource elements or the modified set of locations of the DMRS resource elements.

15. The UE of claim 14, wherein the instructions operable to cause the UE to monitor for the downlink control information are operable, when executed by the one or more processors, to cause the UE to:
perform channel estimation based at least in part on the at least one of the modified density of the DMRS resource elements or the modified set of locations of the DMRS resource elements.

16. The UE of claim 14, wherein the configuration is a control resource set configuration associated with the PDCCH.

17. The UE of claim 14, wherein the indication is included in at least one of UE-specific downlink control information, group common downlink control information, or a medium access control (MAC) control element.

18. The UE of claim 14, wherein the indication is an indication to change the at least one of the density of the DMRS resource elements or the set of locations of the DMRS resource elements.

19. The UE of claim 14, wherein the configuration includes the plurality of DMRS density and location options having corresponding DMRS densities of the DMRS resource elements and sets of locations of the DMRS resource elements, and wherein the indication indicates the selected DMRS density and location option of the plurality of DMRS density and location options.

20. The UE of claim 19, wherein the plurality of DMRS density and location options include a first DMRS density and location option and a second DMRS density and location option, and wherein the configuration sets the density of the DMRS resource elements to a first density corresponding to the first DMRS density and location option and sets the set of locations of the DMRS resource elements to a first set of locations corresponding to the first DMRS density and location option.

21. The UE of claim 20, wherein the indication indicates the second DMRS density and location option, and wherein the modified density of the DMRS resource elements is a second density corresponding to the second DMRS density and location option and the modified set of locations of the DMRS resource elements is a second set of locations corresponding to the second DMRS density and location option.

22. The UE of claim 19, wherein the plurality of DMRS density and location options are based at least in part on at least one of a frequency range of the one or more resource element groups or a frequency band of the one or more resource element groups.

23. The UE of claim 19, wherein the configuration is a control resource set configuration and the plurality of DMRS density and location options are based at least in part on a number of orthogonal frequency division multiplexing symbols associated with the control resource set, a bandwidth of the control resource set, or a number of resource blocks associated with the control resource set.

24. The UE of claim 19, wherein the plurality of DMRS density and location options includes a DMRS density and location option for which a corresponding density of the DMRS resource elements is ½.

25. The UE of claim 19, wherein the one or more resource element groups include a resource element group bundle including a first resource element group associated with a first orthogonal frequency division multiplexing symbol and a second resource element group associated with a second orthogonal frequency division multiplexing symbol, and wherein the plurality of DMRS density and location options includes a DMRS density and location option for which a corresponding set of locations of the DMRS resource elements includes a different locations in the first resource element group and the second resource element group of the resource element group bundle.

26. The UE of claim 14, wherein the indication indicates a PDCCH monitoring option, and the at least one of the modified density of the DMRS resource elements or the modified set of locations of the DMRS resource elements is based at least in part on the indication of the PDCCH monitoring option.

27. The UE of claim 26, wherein the configuration indicates an associated density of the DMRS resource elements for the PDCCH monitoring option and an associated set of locations of the DMRS resource elements for the PDCCH monitoring option, and wherein the modified density of the DMRS resource elements is the associated density of the DMRS resource elements for the PDCCH monitoring option and the modified set of locations of the DMRS resource elements is the associated set of locations of the DMRS resource elements for the PDCCH monitoring option.

28. The UE of claim 26, wherein the indication is an indication to activate at least one of PDCCH coverage enhancement or PDCCH monitoring aggregation.

29. A non-transitory computer-readable medium storing one or more instructions for wireless communication that, when executed by one or more processors of a user equipment (UE), cause the UE to:
  receive a configuration that indicates a density of demodulation reference signal (DMRS) resource elements and a set of locations of the DMRS resource elements in one or more resource element groups associated with a physical downlink control channel (PDCCH);
  receive an indication of a selected DMRS density and location option from a plurality of DMRS density and location options, the indication further being of a change to at least one of the density of the DMRS resource elements or the set of locations of the DMRS resource elements, resulting in at least one of a modified density of the DMRS resource elements or a modified set of locations of the DMRS resource elements, wherein the modified density of the DMRS resource elements and the modified set of locations of the DMRS resource elements correspond to the selected DMRS density and location option; and
  monitor for downlink control information in a search space associated with the PDCCH based at least in part on the at least one of the modified density of the DMRS resource elements or the modified set of locations of the DMRS resource elements.

30. An apparatus for wireless communication, comprising:
  means for receiving a configuration that indicates a density of demodulation reference signal (DMRS) resource elements and a set of locations of the DMRS resource elements in one or more resource element groups associated with a physical downlink control channel (PDCCH);
  means for receiving an indication of a selected DMRS density and location option from a plurality of DMRS density and location options, the indication further being of a change to at least one of the density of the DMRS resource elements or the set of locations of the DMRS resource elements, resulting in at least one of a modified density of the DMRS resource elements or a modified set of locations of the DMRS resource elements, wherein the modified density of the DMRS resource elements and the modified set of locations of the DMRS resource elements correspond to the selected DMRS density and location option; and
  means for monitoring for downlink control information in a search space associated with the PDCCH based at least in part on the at least one of the modified density of the DMRS resource elements or the modified set of locations of the DMRS resource elements.

* * * * *